US005834543A

United States Patent [19]

Garrison

[11] Patent Number: 5,834,543

[45] Date of Patent: Nov. 10, 1998

[54] IMPACT DISPERSING COMPOSITIONS

[76] Inventor: Tim Garrison, 3806 E. Hancock, Muskogee, Okla. 74403

[21] Appl. No.: 580,494

[22] Filed: Dec. 28, 1995

Related U.S. Application Data

[60] Division of Ser. No. 339,023, Nov. 14, 1994, abandoned, which is a continuation-in-part of Ser. No. 168,775, Dec. 16, 1993, Pat. No. 5,363,631.

[51] Int. Cl.[6] .......... C08J 5/29

[52] U.S. Cl. .......... 524/198; 524/507; 524/567; 524/569

[58] Field of Search .......... 524/198, 507, 524/567, 569

[56] References Cited

U.S. PATENT DOCUMENTS

| | | | |
|---|---|---|---|
| 3,663,973 | 5/1972 | Spence | 5/450 |
| 3,737,930 | 6/1973 | Smith, III | 5/348 WB |
| 4,456,642 | 6/1984 | Burgdorfer et al. | 428/68 |
| 4,588,229 | 5/1986 | Jay | 5/450 |
| 4,974,397 | 12/1990 | Ricken | 54/66 |
| 5,119,618 | 6/1992 | Streck | 54/66 |
| 5,130,402 | 7/1992 | Akiyama et al. | 524/198 |
| 5,175,889 | 1/1993 | Infusino | 2/413 |
| 5,175,986 | 1/1993 | Farley | 54/44.1 |
| 5,284,918 | 2/1994 | Huynh-Tran et al. | 524/198 |
| 5,299,412 | 4/1994 | Cudney et al. | 54/66 |

OTHER PUBLICATIONS

WRS Group Inc., Promotional Material, date unknown.

*Primary Examiner*—Peter D. Mulcahy
*Attorney, Agent, or Firm*—Fellers, Snider, Blankenship, Bailey & Tippens

[57] ABSTRACT

Impact dispersing compositions, comprising a mixture of a Component A and a Component B. Component A is itself a mixture of polyvinyl chloride and plasticizers (softeners), while Component B is urethane. The compositions may be used in a variety of ways to absorb and dissipate impact forces.

4 Claims, 2 Drawing Sheets

IMPACT DISPERSING COMPOSITIONS

RELATED APPLICATIONS

This application is a divisional of application Ser. No. 08/339,023 filed on Nov. 14, 1994, now abandoned, which is a continuation-in-part of application Ser. No. 08/168,775 filed Dec. 16, 1993, now U.S. Pat. No. 5,363,631.

BACKGROUND OF THE INVENTION

1. Field of Invention

The present invention relates generally to compositions of matter, and, more particularly, to impact dispersing compositions having a wide variety of applications.

2. Background

Almost innumerable are the circumstances in which impact forces are desired to be attenuated. Applicant, in his copending U.S. patent application, Ser. No. 08/168,775, provides an impact dispersing, shock-reducing saddle pad for use in the equine industry.

Applicant's improved saddle pad meets an existing need in the equine industry for an improved, impact dispersing apparatus for use under the saddle of a horse. It was found that Applicant's saddle pad performs significantly better than prior art cushioning substances. An important component disclosed in Applicant's copending application is a novel, impact dispersing, resilient gel mold that absorbs impact forces imparted to it. In addition to its use in connection with Applicant's previous invention, Applicant has discovered that its novel gel composition is useful in a wide variety of uses both within the equine industry and in other unrelated fields.

While this application is directed to Applicant's novel compositions and their use in general to provide for the reduction of impact forces transmitted to protected objects, Applicant describes hereinafter, for purposes of illustration and so that Applicant's invention can be fully appreciated, the use of its impact dispersing compositions in equine saddle pads.

Commonly, saddle pads are placed between the horse and saddle to protect the horse from irritation caused by the weight of the saddle and rider and to help prevent slippage of the saddle from its proper position over the withers and back of the horse. Historically, blankets and other woven products were used between the horse and saddle. More recently, cushioning substances such as polyurethane foams have been employed to create a pad between the horse and saddle.

These saddle blankets and foam saddle pads, while providing some protection to the horse, do not, however, give much relief from the constant rubbing and pounding the saddle and rider inflict on horses generally, and especially horses involved in rigorous training regimens. Horses subjected to daily training are prone to develop soreness over the withers, shoulders and back. This soreness is attributable to the tendency of the saddle to dig into the horse's withers and back, abrasions caused by the rubbing of the saddle, bruises administered by the bouncing weight of the saddle and rider, and/or structural defects in bones, ligaments and tendons produced by sharp impact forces generated by the saddle and rider.

Additionally, woven blankets and most saddle pads are absorptive in nature, soaking up the sweat of the horse. This diminishes the horse's ability to cool itself through the evaporation of sweat. Further, saddle blankets and pads have a tendency to splay out from the horse at their periphery rather than conforming to the contour of the horse, decreasing the surface area contacted by the blankets or pads. Still further, the blankets and pads tend to become compressed after periods of use. The more compressed the blankets and pads become, the less effective they are in preventing injury to the animal.

SUMMARY OF THE INVENTION

It is an object of this invention to provide impact dispersing compositions which significantly lessen the impact forces imparted to the object of the force by counterbalancing and dispersing inwardly directed forces instead of passing on such forces to the recipient object.

It is another object of this invention to provide impact dispersing gel compositions which are moldable to a variety of shapes and are useful for a multiplicity of purposes (saddle pads being one such intended use), the compositions being relatively quick and easy to manufacture.

It is a further object of this invention to provide impact dispersing compositions which are adaptable for use in almost any field of endeavor where impact forces are sought to be reduced or eliminated.

These and other objects of the present invention are achieved by providing impact reducing gel compositions comprising a mixture of two components, hereinafter referred to as Component A and Component B. Component A is itself a mixture of polyvinyl chloride and plasticizers. Component B is urethane or its equivalent. The preferred composition of the present invention is obtained by a relatively simple and expeditious process. Polyvinyl chloride is first mixed with plasticizers to obtain a first mixture. Preferably, the polyvinyl chloride and plasticizers are mixed a volumetric ratio of 17% polyvinyl chloride to 83% plasticizer. This first mixture is then heated to approximately 200° F. After heating, urethane is added to the first mixture to obtain a second mixture. Preferably, the first mixture and urethane are combined at a volumetric ratio of 87.5% of the first mixture to 12.5% urethane. The second mixture is then heated to between 350° F. and 400° F. After the second mixture reaches its target temperature, it is poured into an appropriate mold and allowed to cool. This cooling usually takes only twenty minutes.

As detailed herein with respect to their use in saddle pads, the compositions of the present invention have utility in the equine accessory industry. They are further useful, however, in solving well-known existing problems in impact attenuation common throughout many different fields. In the sports field, for instance, the compositions of the present invention can function as a component of impact reducing equipment and padding, such as in helmet liners, shoulder pads, rib guards, hip and thigh protectors, and shin guards. The compositions may also be used in shoe insoles, both in sporting shoes and daily wear dress shoes, to help cushion the feet from ground impacts. They are also useful in the medical field, such as for casting, and even in such areas as automotive safety engineering, where they could be used for improved impact reducing dash boards and the like. Of course, these listed uses are illustrative, as the compositions described herein and obtained by the disclosed process are useful in any field where reducing the force of a blow is desired.

Again, turning to the use of the present invention in connection with an improved, shock-reducing saddle pad, there is described a pad comprising a layer of polyurethane foam having an upper side to which is attached a T-shaped pocket. Inside the T-shaped pocket there is a plastic-encased impact dispersing gel mold. A cover material is placed over the entire upper side of the layer of polyurethane foam, including the T-shaped pocket filled with the gel mold. To the under side of the layer of polyurethane foam there is attached a layer of a lightweight, closed-cell elastomeric rubber which, while also absorbing downwardly directed impact forces, conforms to the contour of the horse's back, preventing slippage of the saddle pad and saddle, though not absorbing sweat.

A better understanding of the present invention, and the objects thereof, will be obtained from the following description, taken in conjunction with the attached drawings.

DETAILED DESCRIPTION OF THE PREFERRED EMBODIMENT

Figure 1:
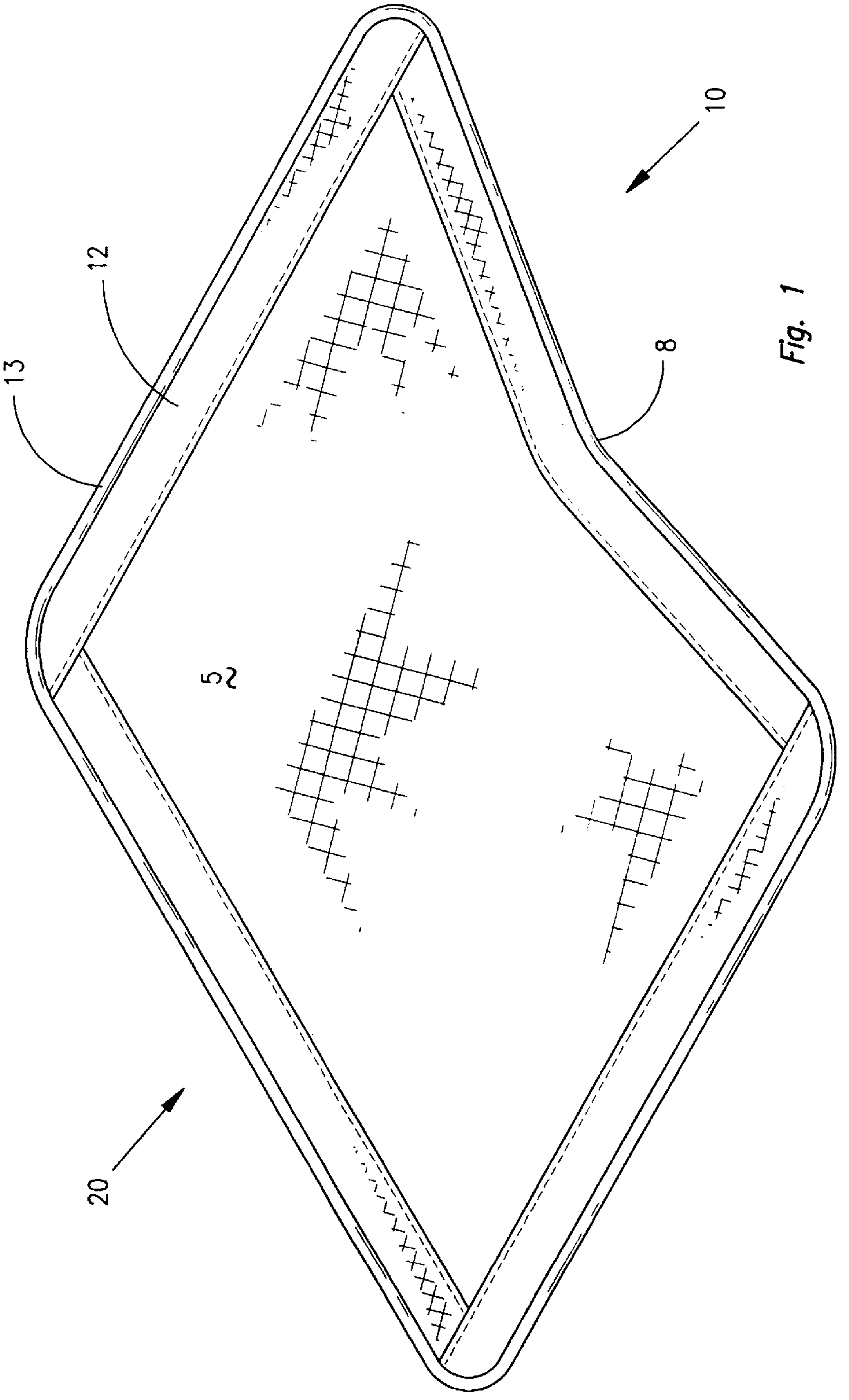
FIG. 1 is a three-quarter perspective view of the top side of a saddle pad which utilizes the impact dispersing compositions of the present invention.

Whereas the present invention will be described in further detail below, and is particularly illustrated in relation to the drawings attached hereto, it should be understood that other and further modifications, apart from those shown or suggested herein, may be made within the spirit and scope of this invention.

The impact dispersing compositions of the present invention generally comprise of a mixture of two components, Component A and Component B.

Component A is a mixture of polyvinyl chloride and plasticizers. Polyvinyl chloride is a well-known substance used as a rubber substitute in many industrial applications. It is essentially a chlorethane homopolymer. Plasticizers are those substances that "plasticize," or "make plastic". Plastics are thermosetting polymers of high molecular weight that can be molded, cast, extruded, drawn or laminated into objects, films or filaments. Plasticizers are generally added to rubbers and resins to impart flexibility, workability or stretchability. The plasticizers utilized in the present invention, also known as softeners, are also well-known by those skilled in the art. They consist essentially of any available softener complementary to polyvinyl chloride, such as MF LIQUID PLASTIC or MF SUPERSOFT PLASTIC, both available from MF Manufacturing Company.

Component B of the compositions of the present invention is preferably urethane. In its pure form urethane is a crystalline compound of the formula $C_3H_7NO_2$ that is the ethyl ester of carbamic acid. It is used commonly as a solvent.

Preferably, the polyvinyl chloride and plasticizer of Component A are combined at volumetric ratio of approximately 17% polyvinyl chloride to 83% plasticizer. This ratio may vary, however, depending upon the rigidity sought as a characteristic of the manufactured article. The rigidity, resiliency and softness of the compositions of the present invention are variable and may be manipulated in accordance with the type of plasticizer utilized and the volumetric ratio of plasticizer used in comparison with polyvinyl chloride.

Component B, urethane, is preferably mixed with Component A at a ratio by volume of approximately 87.5% Component A to 12.5% urethane. Again, the amount of urethane added to the mixture of Component A is somewhat variable, dependant upon the desired characteristics of the end composition. These desired characteristics may differ for assorted uses of the compositions.

The impact dispersing compositions of the present invention are preferably formed by a multi-step mixing and heating process. First, polyvinyl chloride and plasticizers are combined to obtain a first mixture. As stated above, the preferred ratio of this mixture, by volume, is 17% polyvinyl chloride to 83% plasticizer. This first mixture is then heated to approximately 200° F. After heating, urethane is added to the first mixture to obtain a second mixture. Again, preferably the volumetric ratio of the first mixture to urethane is approximately 87.5% to 12.5%. This second mixture is then heated to between 350° F. and 400° F. After the second mixture reaches its target temperature range, the mixture may be poured into molding trays, where the composition cools in approximately twenty minutes to form the gel molds to be utilized in the desired application.

The final composition obtained, after cooling, is in the form of a flexible, resilient gel which may be encased by flexible plastic wrapping for use as a component in various instruments or devices. If plastic wrapping is used around the gel composition, it may be heat-sealed around the gel mold to obtain a plastic-encased gel composition that is easy to handle and store. A layer of elastomeric rubber, of a thickness or approximately ⅛ inch or so, may be used in connection with the gel compositions to further provide a covering for the compositions and to supply added resiliency.

The impact dispersing compositions heretofore described work to substantially reduce the impact forces transmitted to the object of a force. First, the resilient characteristic of the compositions functions to supply a reactant force in response to a force directed into the compositions. Secondly, the compositions of the present invention allow for a wave-like dispersal of the impact forces throughout the utilized gel mold.

Turning to their illustrative use in connection with a saddle pad, and referring now to FIG. 1, the front end of a saddle pad is indicated generally by the numeral 10, while the posterior end is generally indicated by the numeral 20. A cover material 5 is exposed on the top side of the saddle pad. The front end 10 of the saddle pad is slightly V-shaped so as to create a withers' notch 8 which aids in stabilizing the saddle pad while in place on the horse. Around the periphery of the top side of the saddle pad is sewn a border 12. Surrounding border 12 is a double seam binding 13.

The cover material 5 and the border 12 of the saddle pad may be made of any tough, non-elastic material. Marine vinyl or leather is generally utilized.

Figure 2:
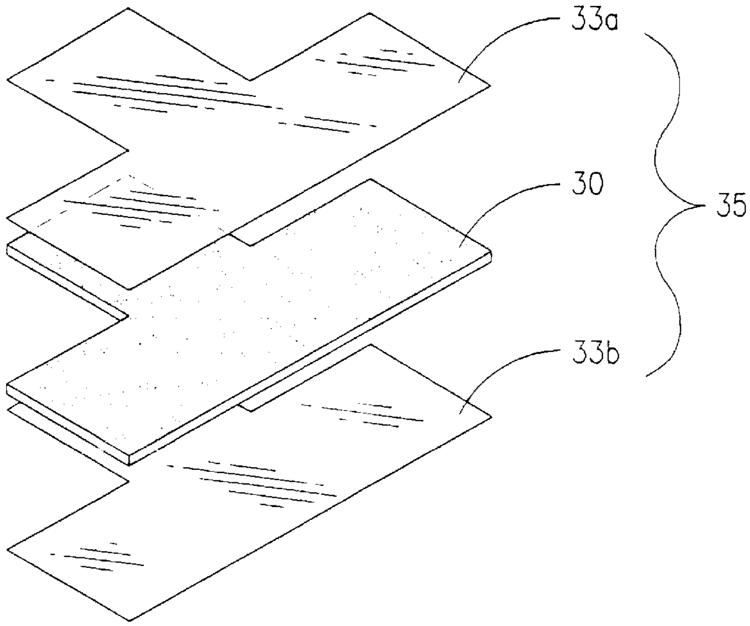
FIG. 2 is an exploded view of the plastic-encased T-shaped gel mold of the saddle pad.

Referring now to FIG. 2, the impact-reducing, plastic-encased gel composition in the form of a mold is generally indicated by the numeral 35. Gel mold 30 comprises a mixture of polyvinyl chloride, well-known plasticizers (softeners), and urethane. Gel mold 30 is formed as heretofore described by (1) mixing polyvinyl chloride with plasticizers to obtain a first mixture, having the approximate color and viscosity of milk, (2) heating the first mixture to approximately 200° F., (3) adding to the first mixture approximately 12.5% by volume of urethane to obtain a second mixture, and (4) heating the second mixture to approximately 350° F. to obtain a final gel composition. The ratio in the first mixture of polyvinyl chloride to plasticizers is widely variable, with gel mold 30 correspondingly increasing or decreasing in softness depending upon the quality and quantity of plasticizers utilized. Generally, however, a first mixture of around 17% polyvinyl chloride to 83% plasticizers is recommended. After heating, the final gel composition is poured into molding trays, where the composition cools in approximately 20 minutes to form the gel mold 30.

Gel mold 30 is encased by two sheets of flexible plastic wrapping 33*a* and 33*b*. The periphery of the two sheets of plastic wrapping are heat sealed around gel mold 30 to obtain plastic-encased gel mold 35.

Figure 3:
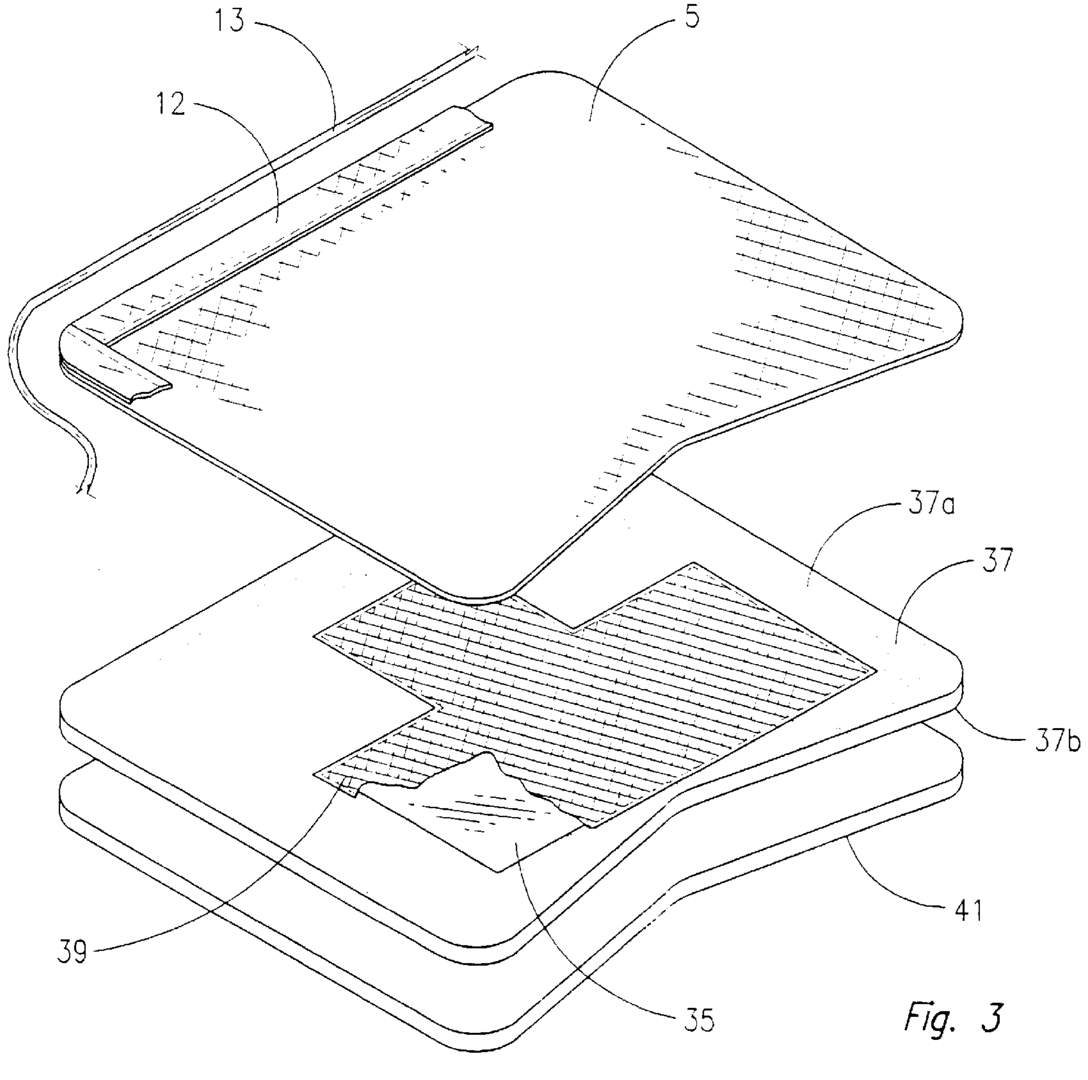
FIG. 3 is an exploded view of the saddle pad as a whole.

Referring now to FIG. 3, a saddle pad is shown comprising a layer of polyurethane foam 37 having an upper surface 37*a* and a lower surface 37*b*. The plastic-encased gel mold 35 is disposed on the upper surface 37*a* of the layer of polyurethane foam 37. A dust cover material 39, slightly larger in size than plastic-encased gel mold 35, is sewn about plastic-encased gel mold 35 directly to upper surface 37*a* of the layer of polyurethane foam 37. The attachment of the dust cover material 39 to upper surface 37*a* of the layer of polyurethane foam 37 creates a pocket which functions to hold in place plastic-encased gel mold 35.

To lower surface 37*b* of the layer of polyurethane foam 37 there is attached a cheesecloth backing (not shown). To the cheesecloth backing of the layer of polyurethane foam 37 there is adhesively attached a layer of a closed-cell elastomeric rubber 41, such as NBR/PVC elastomeric foam, trade name INSOL-SHEET, manufactured by Halstead Industries. A cover material 5 of marine vinyl or leather is placed over upper surface 37*a* of the layer of polyurethane foam 37, including the T-shaped dust cover material 39. The periphery of cover material 5, layer of polyurethane foam 37 and layer of elastomeric rubber 41 are bound by the use of border 12 and a double sewn binding 13.

In the saddle pad shown, the layer of polyurethane foam 37 is approximately ½ inch to ¾ inch in thickness. Gel mold 30 is approximately ⅛ inch to ¼ inch in thickness, and the layer of elastomeric rubber 41 is approximately ⅜ inch in thickness.

The saddle pad can be economically manufactured in a variety of shapes and sizes to accommodate varying sizes of horses and styles of saddles. But regardless of the size or style of the saddle pad, it functions to significantly reduce the risk of soreness or injury in horses, whether the horse is a pleasure horse ridden intermittently or whether the horse is involved in a demanding training program.

Gel mold 30 works to substantially reduce the impact forces transmitted to the horse by the bouncing weight of the rider and operates to prevent significant compression of the saddle pad over time. First, the resilient characteristic of gel mold 30 functions to supply a reactant upwardly directed force in response to the downwardly directed forces associated with the weight of the saddle and rider. Secondly, the composition of gel mold 30 allows for the wave-like dispersal of the downwardly directed impact forces throughout gel mold 30.

In a test relating to impact attenuation, or energy absorption, (similar to one widely used in the automotive industry), a headform dummy was dropped from various heights upon the above-described saddle pad as supported on a recoil measuring device. The average amount of recoil was measured and recorded as an "Average "G" Force". A zero measurement would mean that the impact was completely attenuated, such as would be the case if the headform dummy was dropped, for example, into jello. A measurement under 200 is considered good, under 100 is considered excellent:

| Drop Height | Average "G" Force |
|---|---|
| 1 ft. | 65 |
| 2 ft. | 172 |
| 3 ft. | 262 |

A compression set experiment was also conducted on the saddle pad wherein the sample pad was loaded and unloaded. When allowed to recover, the amount that the sample did not recover was measured. This was reported as a percentage, the lower percentage indicating more recovery. A comparison was made between the saddle pad containing an impact dispersing composition of the present invention (i.e. gel mold 30) and a similarly constructed pad which did not contain the present compositions. The results were as follows:

| Sample | Percent Non-Recovery |
|---|---|
| T-Pad | 5.48 av. |
| T-Pad (no gel) | 7.76 av. |

Obviously, the compositions of the present invention functioned to increase the resiliency of the saddle pad.

The layer of elastomeric rubber 41, besides itself absorbing shocks and dispersing vibrations, also conforms to the contour of the horse's back to work like a channel, holding itself and the saddle in place, preventing the sliding of the pad and saddle back and forth over the withers, back and shoulders of the animal or side to side. Further, the rubber material is nonabsorbent, allowing the sweat of the animal to facilitate cooling.

The plastic-encased gel mold 35 when used in connection with the layer of polyurethane foam 37, layer of elastomeric rubber 41 and layer of cover material 5 combines to provide an economical, easily manufactured shock-reducing saddle pad for use by week-end horsemen and professionals alike. The saddle pad overcomes the limitations of the prior art and significantly reduces the risk of injury to horses.

As exemplified by its use in the saddle pad disclosed above, the impact dispersing compositions of the present invention are effective in absorbing and dissipating unwanted forces. It is to be understood that these compositions have utility in any instance where impact attenuation is desired.

The claims and the specification describe the invention presented, and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A composition for dispersing impact forces obtained by a process, said process consisting of:

(a) mixing polyvinyl chloride and plasticizers to obtain a first mixture consisting of said polyvinyl chloride and said plasticizers;

(b) heating said first mixture to approximately 200° F. to obtain a heated first mixture;

(c) adding urethane to said heated first mixture to obtain a second mixture consisting of said polyvinyl chloride, said plasticizers and said urethane;

(d) heating said second mixture to between 350° F. and 400° F. to obtain a heated second mixture; and (e) allowing said heated second mixture to cool to obtain said composition.

2. The composition for dispersing impact forces obtained by the process according to claim 1, wherein said polyvinyl chloride and said plasticizers are mixed at a volumetric ratio of approximately 17% said polyvinyl chloride to 83% said plasticizers.

3. The composition for dispersing impact forces obtained by the process according to claim 1, wherein said urethane is added to said first mixture a volumetric ratio of approximately 87.5% said first mixture to 12.5% said urethane.

4. A composition for dispersing impact forces obtained by a process, said process consisting of:

(a) mixing polyvinyl chloride and plasticizers at a ratio of 17% said polyvinyl chloride to 83% said plasticizer by volume to obtain a first mixture consisting of said polyvinyl chloride and said plasticizers;

(b) heating said first mixture to approximately 200° F. to obtain a heated first mixture;

(c) adding urethane to said first mixture at a ratio of 87.5% said first mixture to 12.5% said urethane by volume to obtain a second mixture consisting of said polyvinyl chloride, said plasticizers and said urethane;

(d) heating said second mixture to between 350° F. and 400° F. to obtain a heated second mixture;

(e) pouring said heated second mixture into a mold; and (f) allowing said second mixture to cool to obtain a final gel composition.

* * * * *